United States Patent
Ito

(10) Patent No.: US 7,285,939 B2
(45) Date of Patent: Oct. 23, 2007

(54) DC-DC CONVERTER FOR BOOSTING INPUT VOLTAGE AT VARIABLE FREQUENCY

(75) Inventor: Masahiko Ito, Anjo (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/075,661

(22) Filed: Mar. 10, 2005

(65) Prior Publication Data

US 2005/0206361 A1  Sep. 22, 2005

(30) Foreign Application Priority Data

Mar. 17, 2004  (JP) .............................. 2004-076491

(51) Int. Cl.
*G05F 1/00* (2006.01)

(52) U.S. Cl. ...................... 323/222; 323/285
(58) Field of Classification Search ................ 323/222, 323/223, 225, 282, 285, 288, 351
See application file for complete search history.

(56) References Cited

U.S. PATENT DOCUMENTS

| 4,190,882 A | * | 2/1980 | Chevalier et al. ............. 363/26 |
| 4,516,038 A | * | 5/1985 | Glennon ..................... 327/113 |
| 5,180,964 A | * | 1/1993 | Ewing ........................ 323/222 |
| 6,011,707 A | * | 1/2000 | Mine .......................... 363/89 |
| 6,107,851 A | * | 8/2000 | Balakirshnan et al. ...... 327/172 |
| 6,115,274 A | * | 9/2000 | Mao ........................... 363/89 |
| 6,198,258 B1 | * | 3/2001 | Ando et al. .................. 323/222 |
| 6,204,649 B1 | * | 3/2001 | Roman ........................ 323/282 |
| 6,243,277 B1 | * | 6/2001 | Sun et al. ..................... 363/65 |
| 6,249,876 B1 | * | 6/2001 | Balakrishnan et al. ...... 713/501 |
| 6,657,417 B1 | * | 12/2003 | Hwang ....................... 323/222 |
| 6,784,625 B1 | * | 8/2004 | Andrews ..................... 315/276 |
| 6,969,978 B2 | * | 11/2005 | Dening ....................... 323/282 |
| 6,992,877 B2 | * | 1/2006 | DeVries et al. ............. 361/248 |
| 7,009,368 B2 | * | 3/2006 | Mayumi ..................... 323/222 |
| 7,026,851 B2 | * | 4/2006 | Yang et al. .................. 327/172 |
| 2004/0232979 A1 | * | 11/2004 | Edwards et al. ............. 330/10 |
| 2005/0110473 A1 | * | 5/2005 | Mitsuo ....................... 323/271 |

FOREIGN PATENT DOCUMENTS

| JP | A-2002-34240 | 1/2002 |
| JP | A-2003-174768 | 6/2003 |
| JP | A-2003-274656 | 9/2003 |
| JP | A-2004-159418 | 6/2004 |

* cited by examiner

*Primary Examiner*—Bao Q. Vu
*Assistant Examiner*—Harry Behm
(74) *Attorney, Agent, or Firm*—Posz Law Group, PLC

(57) ABSTRACT

A DC-DC converter for boosting an input voltage to a higher output voltage includes an inductor, a field effect transistor, a first ON signal generating circuit, a second ON signal generating circuit, an OFF signal generating circuit, a transistor driving signal generating circuit, and a switching frequency varying circuit. The switching frequency varying circuit changes a first ON time with the passage of time, so that the energy of switching noise is diffused without concentrating at specific frequencies. Thus, magnitude of the energy of switching noise in each switching frequency can be reduced.

14 Claims, 5 Drawing Sheets

US 7,285,939 B2

DC-DC CONVERTER FOR BOOSTING INPUT VOLTAGE AT VARIABLE FREQUENCY

CROSS REFERENCE TO RELATED APPLICATION

This application is based on and incorporates herein by reference Japanese Patent Application No. 2004-76491 filed on Mar. 17, 2004.

FIELD OF THE INVENTION

The present invention relates to a DC-DC converter, which boosts an input power supply voltage to a load driving output voltage.

BACKGROUND OF THE INVENTION

One type of a DC-DC converter is disclosed in JP 2003-174768A, for example. As shown in FIG. 5, this DC-DC converter 10 includes: an inductor 111; a diode 112; a capacitor 119; a MOSFET 113a; a resistor 120; a switching control circuit 115; and an MPU 22.

One end of the inductor 111 is connected to the positive side of a battery power supply 2 through a positive input terminal 10a, and the other end is connected to the anode of the diode 112. The negative side of the battery power supply 2 is connected to a negative input terminal 10b. The cathode of the diode 112 is connected to one end of the capacitor 119 and a positive output terminal 1c. The other end of the capacitor 119 is connected to a negative output terminal 1d.

The drain of the MOSFET 113a is connected to the junction of the inductor 111 and the diode 112, its gate is connected to the switching control circuit 115, and its source is connected to the negative input terminal 10b and the negative output terminal 1d through the resistor 120. Two input terminals of the switching control circuit 115 are connected to the MPU 22, and its output terminal is connected to the source of the MOSFET 113a.

One input terminal of the MPU 22 is connected to the positive side of the battery power supply 2, another input terminal is connected to the junction of the diode 112 and the capacitor 119, and further input terminal is connected to the junction of the source of the MOSFET 113a and the resistor 120. Two output terminals of the MPU 22 are respectively connected to the switching control circuit 115.

The MPU 22 generates a basic switching signal for switching the MOSFET 113a based on the comparison between a basic step-up signal stored in an internal ROM 226 and a triangular signal. A duty factor of the basic switching signal changes based on the result of comparison among the voltage of the battery power supply 2, the voltage of the capacitor 119, a current flowing to the inductor 111 through the MOSFET 113a, and a standard change curve stored beforehand.

The switching control circuit 115 switches the MOSFET 113a based on the switching signal from the MPU 22. When the MOSFET 113a turns on, a current flows from the battery power supply 2 to the inductor 111, and magnetic energy is stored in the inductor 111. When the MOSFET 113a turns off, the magnetic energy stored in the inductor 111 is discharged through the diode 112, and the capacitor 119 is charged with this discharging current.

At this time, since a voltage is induced between the terminals of the inductor 111, the voltage of the capacitor 119 becomes higher than that of the voltage of the battery power supply 2. Thus, the DC-DC converter 10 steps up or boosts the voltage of the battery power 2 to a stable, specified high voltage and outputs it.

This DC-DC converter 10 generates switching noise according to the switching of the MOSFET 113a. The frequency of the switching noise corresponds to a switching frequency of the MOSFET 113a. This switching frequency is uniquely determined depending on the frequency of the triangular signal stored in the ROM 226 of the MPU 22. Therefore, the energy of the switching noise concentrates at the switching frequency. As a result, the energy of the switching noise in the switching frequency increases and may influence the operation of an electronic controller and the like disposed in the vicinity of the DC-DC converter 10.

SUMMARY OF THE INVENTION

The present invention has an object to provide a DC-DC converter that can diffuse and reduce switching noise without concentrating at a specific frequency by changing switching frequencies independently of the magnitude of an output voltage.

A DC-DC converter for an electric load includes a coil connected to a DC power supply and a switching element. The switching element is connected to the coil and controls a coil current supplied to the coil from the DC power supply by performing switching operations to produce a boosted output voltage for the electric load. A switching element driving signal generating circuit generates a switching element driving signal for switching the switching element based on the coil current and the output voltage. A switching frequency varying circuit that changes a switching frequency of the switching element driving signal with passage of time regardless of the output voltage.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

The present invention will be described in detail with reference to various embodiments applied to an airbag device. In the following embodiments, the same or like numerals designate the same or like parts.

First Embodiment

Figure 1:
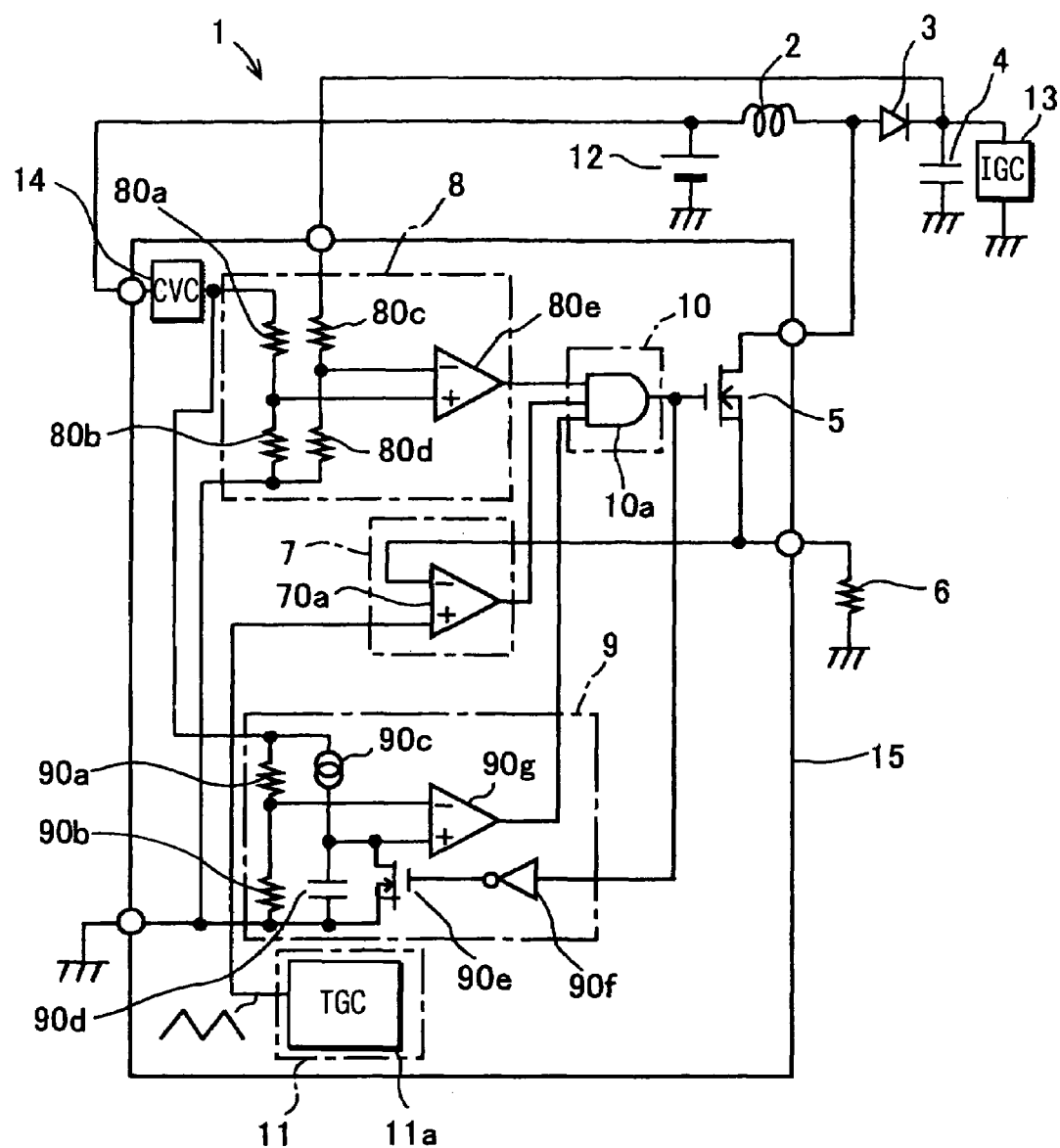
FIG. 1 is a circuit diagram of a DC-DC converter according to a first embodiment of the present invention.

Referring to FIG. 1, a DC-DC converter 1 includes: an inductor (coil) 2; a diode 3; a capacitor 4; a field effect transistor (FET: switching element) 5; a resistor 6; a first ON signal generating circuit 7; a second ON signal generating circuit 8; an OFF signal generating circuit 9; a transistor driving signal generating circuit (switching element driving signal generating circuit) 10; and a switching frequency varying circuit (FVC) 11.

The inductor 2 is an element that stores and discharges magnetic energy, and induces voltage. One end of the inductor 2 is connected to the positive pole terminal of a battery 12, and the negative pole terminal of the battery 12 is grounded to a vehicle chassis. The other end of the inductor 2 is connected to one end of the capacitor 4 and one end of an ignition circuit (IGC) 13 of the airbag device through the diode 3. The other end of the capacitor 4 and the other end of the ignition circuit 13 are grounded to the chassis.

The field effect transistor 5 is a switching element that controls a current flowing to the inductor 2. The drain of the field effect transistor 5 is connected to the junction of the inductor 2 and the diode 3, the gate is connected to the transistor driving signal generating circuit 10, and the source is connected to one end of the resistor 6 through a current detection terminal. The other end of the resistor 6 is grounded to the chassis.

The first ON signal generating circuit 7 determines a first ON time of the field effect transistor 5 based on the result of comparison between the magnitude of the coil current flowing through the inductor 2 through the field effect transistor 5 and a specified current threshold value. It generates a first ON signal corresponding to the length of the ON time. The first ON signal generating circuit 7 includes a comparator 70*a*. The inverting input terminal of the comparator 70*a* is connected to the source of the field effect transistor 5 and the resistor 6 through the current detection terminal, its non-inverting input terminal is connected to the switching frequency varying circuit 11, and its output terminal is connected to the input terminal of the transistor driving signal generating circuit 10.

The second ON signal generating circuit 8 determines a second ON time of the field effect transistor 5 based on the result of comparison between the magnitude of output voltage and a specified voltage threshold value, and generates a second ON signal corresponding to the length of the second ON time. The second ON signal generating circuit 8 includes resistors 80*a*, 80*b*, 80*c*, 80*d* and a comparator 80*e*.

The resistors 80*a* and 80*b* are connected in series. One end of the resistors 80*a* and 80*b* connected in series is connected to an output terminal of a constant voltage circuit (CVC) 14 that generates a constant voltage from the voltage inputted through a circuit power terminal. The other end is grounded to the chassis through a ground terminal. The resistors 80*a* and 80*b*, which determine a specified voltage threshold value, are set to an optimum value so that an output voltage required is obtained.

The resistors 80*c* and 80*d* are connected in series. The resistors 80*c* and 80*d* connected in series are connected to the junction of the diode 3 and the capacitor 4 through a voltage detection terminal, and the other end is grounded to the chassis through the ground terminal. The inverting input terminal of the comparator 80*e* is connected to the junction of the resistors 80*c* and 80*d*, its non-inverting input terminal is connected to the junction of the resistors 80*a* and 80*b*. Its output terminal is connected to the other input terminal of the transistor driving signal generating circuit 10.

The OFF signal generating circuit 9 includes: resistors 90*a* and 90*b*; a constant current source 90*c*; a capacitor 90*d*; a field effect transistor 90*e*; a NOT circuit 90*f*; and a comparator 90*g*. The OFF signal generating circuit 9 generates an OFF signal for holding the field effect transistor 5 off for a specified time after it is turned off. This OFF signal is generated based on the result of the comparison between the magnitude of voltage of the capacitor 90*d* charged with a constant current from the constant current source 90*c*, and OFF time threshold value determined by voltage division by the resistors 90*a* and 90*b*.

The resistors 90*a* and 90*b* are connected in series. One end of the resistors 90*a* and 90*b* connected in series is connected to the output terminal of the constant voltage circuit 14 that generates the constant voltage from the voltage inputted through the circuit power terminal. The other end is grounded to the chassis through the ground terminal. The resistors 90*a* and 90*b*, which determine an OFF time threshold value, are set to an optimum value so that time enough to discharge energy stored in the inductor 2 is secured.

One end of the constant current source 90*c* is connected to the output terminal of the constant voltage circuit 14 that generates the constant voltage from the voltage inputted through the circuit power terminal. The other end is connected to one end of the capacitor 90*d* and the drain of the field effect transistor 90*e* and the other end of the capacitor 90*d* and the source of the field effect transistor 90*e* are grounded to the chassis through the ground terminal. The gate of the field effect transistor 90*e* is connected to the output terminal of the NOT circuit 90*f*, and the input terminal of NOT circuit 90*f* is connected to the output terminal of the transistor driving signal generating circuit 10.

The inverting input terminal of the comparator 90*g* is connected to the junction of the resistors 90*a* and 90*b*, its non-inverting input terminal is connected to the constant current source 90*c* and the junction of the capacitor 90*d* and the field effect transistor 90*e*. Its output terminal is connected to further another input terminal of the transistor driving signal generating circuit 10.

The transistor driving signal generating circuit 10 includes an AND circuit 10 having three input terminals. It generates the driving signal for switching the field effect transistor 5 based on the logical product of the first ON signal, the second ON signal and the OFF signal. The three input terminals of the AND circuit 10*a* are connected to the output terminals of the comparators 70*a*, 80*e* and 90*g*, and its output terminal is connected to the gate of the field effect transistor 5 and the input terminal of the NOT circuit 90*f*.

The switching frequency varying circuit 11 changes a specified current threshold, value of the first ON signal generating circuit 7 with the passage of time. It includes a triangular wave voltage generating circuit 11*a* (AC voltage generating circuit) that generates a voltage that gradually changes in the shape of triangular wave at a constant cycle with the passage of time. Output voltages of the switching frequency varying circuit 11 determine a variable range of switching frequency, and the amplitude of triangular wave voltage is set to an optimum value so that no problem occurs in the fluctuation of output voltages of the DC-DC converter 1.

The field effect transistor 5, the first ON signal generating circuit 7, the second ON signal generating circuit 8, the OFF signal generating circuit 9, the transistor driving signal generating circuit 10 and the switching frequency varying circuit 11 are integrally formed as an IC 15.

In operation, when an ignition switch (not shown) is turned on, the voltage of the battery 12 is applied to one end of the inductor 2. When the field effect transistor 5 turns on, a current flows through a route from the inductor 2 to the resistor 6 via the field effect transistor 5, and magnetic energy is stored in the inductor 2. After that, when the field effect transistor 5 turns off, magnetic energy stored in the inductor 2 is discharged through the diode 3, and the capacitor 4 is charged. At this time, since voltage has been induced across the inductor 2, the voltage of the capacitor 4 becomes higher than that of the battery 12.

When the field effect transistor 5 has turned on, a coil current flowing through the inductor 2 is converted into a voltage by the resistor 6. The voltage of the resistor 6 equivalent to the coil current is compared by the comparator 70a with voltage generated by the triangular wave voltage generating circuit 11a that is equivalent to a current threshold value and changes in the shape of triangular wave at a constant cycle.

When the voltage of resistor 6 is smaller than the voltage generated by the triangular wave voltage generating circuit 11a, the comparator 70a outputs a high level, and otherwise outputs a low level. As a result, the comparator 70a outputs the first ON signal the high level period of which changes with the passage of time.

The voltage of the capacitor 4 is divided by the resistors 80c and 80d. The voltage of the capacitor 4 divided by the resistors 80c and 80d is compared by the comparator 80e with the output voltage of the constant voltage circuit 14 divided by the resistors 80a and 80b which is equivalent to the voltage threshold value.

When the voltage of the capacitor 4 divided by the resistors 80c and 80d is smaller than the output voltage of the constant voltage circuit 14 divided by the resistors 80a and 80b, the comparator 90g outputs a high level, and otherwise outputs a low level. As a result, the comparator 80e outputs the second ON signal the high level period of which is constant. Voltages of the capacitor 4 change much more gently and at longer cycles than coil currents. Therefore, the period in which the second ON signal is at high level is much longer than that of the first ON signal.

When the field effect transistor 5 turns off, the field effect transistor 90e is turned on by the NOT circuit 90e of the OFF signal generating circuit 9. When the field effect transistor 90e turns on, electric charges stored in the capacitor 90d are discharged, and the voltage of the capacitor 90d becomes 0 V. At the same time, the capacitor 90d starts charging by a constant current from the constant current source 90c.

Voltages of the capacitor 90d increase gradually with a constant changing rate determined from a current value of the constant current source 90c and the capacity of the capacitor 90d, and is compared by the comparator 80e with the output voltage of the constant voltage circuit 14 divided by the resistors 90a and 90b which is equivalent to the voltage threshold value.

When the voltage of the capacitor 90d is smaller than the output voltage of the constant voltage circuit 14 divided by the resistors 90a and 90b, the comparator 90g outputs a low level, and otherwise outputs a high level. As a result, the comparator 90g outputs an OFF signal the low level period of which is constant after the transistor 5 turns off.

The first ON signal, the second ON signal and the OFF signal are inputted to the AND circuit 10a of the transistor driving signal generating circuit 10 to be subjected to the AND logic operation. By this operation, the AND circuit 10a periodically and intermittently outputs the transistor driving signal the high level period of which changes with the passage of time and the low level period of which is constant.

The transistor driving signal is applied to the gate of the field effect transistor 5. The field effect transistor 5 repeats switching by turning on when the transistor driving signal is at high level, and turning off when at low level. Thus the DC-DC converter 1 steps up the voltage of the battery 12 to a stable high voltage and supplies them to the ignition circuit 13. When vehicle collision occurs, an ignition current flows from the DC-DC converter 1 to the ignition circuit 13, and the airbag expands to protect a passenger.

According to the first embodiment, in the switching frequency varying circuit 11, the DC-DC converter 1 can change the switching frequency of a driving signal of the field effect transistor 5 with the passage of time regardless of the magnitude of the output voltage. Since the energy of switching noise is diffused without concentrating at specific frequencies, the magnitude of the energy of switching noise in each switching frequency can be reduced.

The DC-DC converter 1 can surely change switching frequencies by changing the ON time of the field effect transistor 5 in the switching frequency varying circuit 11. The DC-DC converter 1 can surely change the ON time of the field effect transistor 5 by changing specified current threshold values in the first ON signal generating circuit 7 by the switching frequency varying circuit 11. The DC-DC converter 1 can continuously and surely change the specified current threshold value in the first ON signal generating circuit 7 by the AC voltage generating circuit 11a of the switching frequency varying circuit 11.

The DC-DC converter 1 can be reduced in size by integrating the field effect transistor 5, the first ON signal generating circuit 7, the second ON signal generating circuit 8, the OFF signal generating circuit 9, the transistor driving signal generating circuit 10, and the switching frequency varying circuit 11.

Furthermore, since the DC-DC converter 1 is used for a vehicle passenger protecting device and reduces its switching noise, the reliability of the vehicle passenger protecting device can be increased.

Second Embodiment

Figure 2:
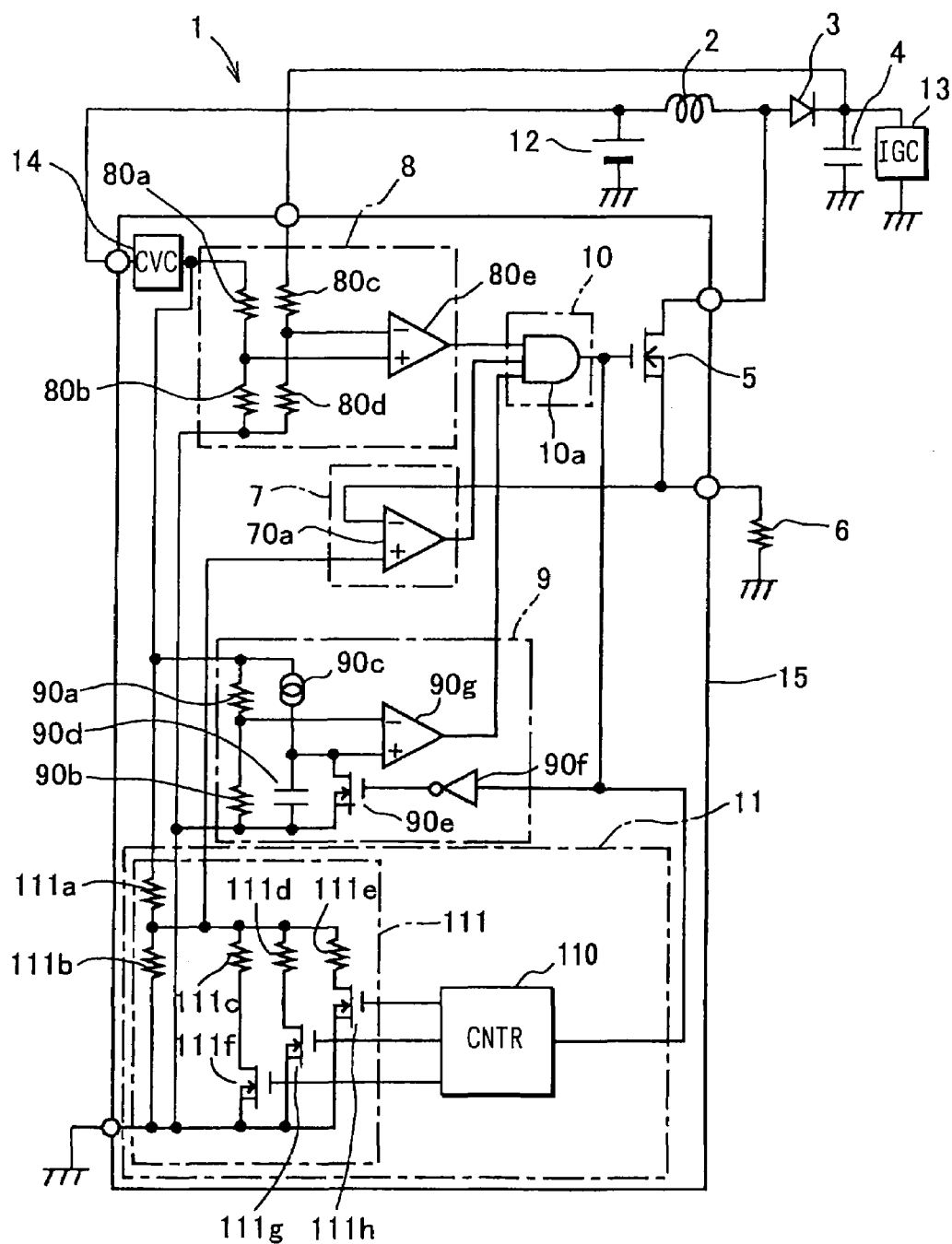
FIG. 2 is a circuit diagram of a DC-DC converter according to a second embodiment of the present invention.

The second embodiment shown in FIG. 2 is different from the first embodiment in that the switching frequency varying circuit 11 includes a counter circuit (CNTR) 110 and a reference power circuit 111. The counter circuit 110 is a three-bit binary counter that counts switching operations of the field effect transistor 5.

The reference power circuit 111 successively switches and outputs a plurality of voltages of different magnitudes according to the result of counting by the counter circuit 110. It includes resistors 111a to 111e and field effect transistors 111f to 111h.

One end of the resistor 111a is connected to the output terminal of the constant voltage circuit 14 that generates the constant voltage from voltage inputted through the circuit power terminal. Its other end is connected to one ends of the resistors 111b to 111e. The other end of the resistor 111b is grounded to the chassis through the ground terminal. The other end of the resistor 111c is connected to the drain of the field effect transistor 111f. The source of the field effect transistor 111f is grounded to the chassis through the ground terminal. The gate of the field effect transistor 111f is connected to the output terminal of the counter circuit 110.

The other end of the resistor 111d is connected to the drain of the field effect transistor 111g. The source of the field effect transistor 111g is grounded to the chassis through the ground terminal. The gate of the field effect transistor 111g is connected to another output terminal of the counter circuit 110.

The other end of the resistor 111e is connected to the drain of the field effect transistor 111h. The source of the field effect transistor 111h is grounded to the chassis through the ground terminal. The gate of the field effect transistor 111h is connected to further another output terminal of the counter circuit 110.

Output voltages of the reference power circuit 111 determine a variable range of switching frequencies, and the resistors 111a to 111e are set to an optimum value so that no problem occurs in the fluctuation of output voltages of the DC-DC converter 1.

In operation, each time the field effect transistor 5 turns off, the counter circuit 110 counts up. The counter circuit 110 outputs three-bit signals corresponding to the number of switching operations of the field effect transistor 5, and respectively applies the signals to the field effect transistors 111f to 111h of the reference power circuit 111. The field effect transistors 111f to 111h turn on when the output signal of the counter circuit 110 is at high level, and off when at low level. For example, when the field effect transistor 111f turns on, the resistor 111c is connected in parallel with the resistor 111b, and the voltage of the junction of the resistors 111b and 111c connected in parallel with the resistor 111a changes.

In this way, the reference power circuit 111 successively outputs eight types of voltages of different magnitudes to the comparator 70a of the first ON signal generating circuit 7 based on the number of switching operations of the field effect transistor 5.

According to the second embodiment, the DC-DC converter 1 can in steps (non-continuously) and surely change the specified current threshold values in the first ON signal generating circuit 7 by the counter circuit 110 and the reference power circuit 111 of the switching frequency varying circuit 11.

Third Embodiment

Figure 3:
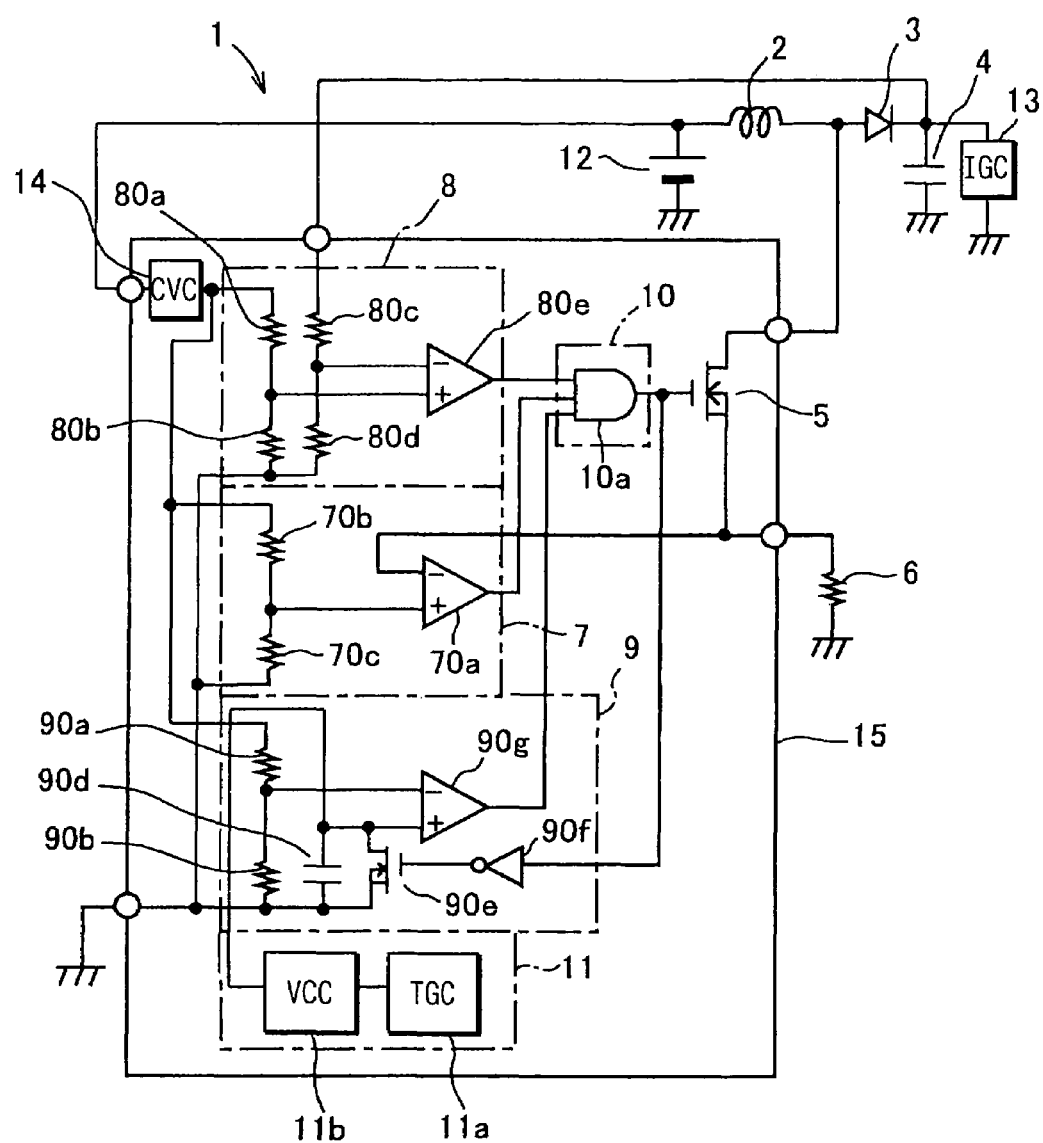
FIG. 3 is a circuit diagram of a DC-DC converter according to a third embodiment of the present invention.

The third embodiment shown in FIG. 3 is different from the first and second embodiments in respect of the first ON signal generating circuit 7, the OFF signal generating circuit 9 and the switching frequency varying circuit 11.

The first ON signal generating circuit 7 includes resistors 70b and 70c in addition to the comparator 70a. The resistors 70b and 70c are connected in series. One end of the resistors 70b and 70c connected in series is connected to the output terminal of the constant voltage circuit 14 that generates the constant voltage from voltage inputted through the circuit power terminal. The other end is grounded to the chassis through the ground terminal. The resistors 80a and 80b, which determine the specified voltage threshold value, are set to an optimum value so that a coil current required is obtained.

The inverting input terminal of the comparator 70a is connected to the source of the field effect transistor 5 and the resistor 6 through the current detection terminal. Its non-inverting input terminal is connected to the junction of the resistors 70b and 70c. Its output terminal is connected to the input terminal of the transistor driving signal generating circuit 10.

The OFF signal generating circuit 9 has no constant current source circuit (90c in FIGS. 1 and 2). The OFF signal generating circuit 9 generates the OFF signal for holding the field effect transistor 5 off for the specified time after it is turned off, based on the result of the comparison between the magnitude of the voltage of the capacitor 90d and the OFF time threshold value determined by voltage division by the resistors 90a and 90b.

The resistors 90a and 90b are connected in series. One end of the resistors 90a and 90b connected in series is connected to the output terminal of the constant voltage circuit 14 that generates the constant voltage from the voltage inputted through the circuit power terminal, and the other end is grounded to the chassis through the ground terminal. The resistors 90a and 90b, which determine the OFF time threshold value, are set to an optimum value so that time enough to discharge energy stored in the inductor 2 is secured.

The capacitor 90d and the field effect transistor 90e are connected in parallel. One end of the capacitor 90d and the drain of the field effect transistor 90e are connected to the switching frequency varying circuit 11. The other end of the capacitor 90d and the source of the field effect transistor 90e are grounded to the chassis through the ground terminal. The gate of the field effect transistor 90e is connected to the output terminal of the NOT circuit 90f. The input terminal of the NOT circuit 90f is connected to the output terminal of the transistor driving signal generating circuit 10.

The inverting input terminal of the comparator 90g is connected to the junction of the resistors 90a and 90b. Its non-inverting input terminal is connected to the capacitor 90d and the junction of the field effect transistor 90e and the switching frequency varying circuit 11. Its output terminal is connected to another input terminal of the transistor driving signal generating circuit 10.

The switching frequency varying circuit 11 supplies a current changing with the passage of time for charging the capacitor 90d of the OFF signal generating circuit 9. It includes, in addition to the triangular wave voltage generating circuit 11a (AC voltage generating circuit) and a voltage-current conversion circuit (VCC) 11b.

The triangular wave voltage generating circuit 11a generates voltage that changes in the shape of triangular wave at a constant cycle with the passage of time. The voltage-current conversion circuit 11b changes an inputted voltage to a current corresponding to the magnitude of the voltage. The output terminal of the triangular wave voltage generating circuit 11a is connected to the input terminal of the voltage-current conversion circuit 11b. The output terminal of the voltage-current conversion circuit 11b is connected to the capacitor 90d, and the junction of the field effect transistor 90e and the inverting input terminal of the comparator 90g.

Output currents of the switching frequency varying circuit 11 determine a variable range of switching frequencies. The amplitude of triangular wave current is set to an optimum value so that no problem occurs in the fluctuation of output voltages of the DC-DC converter 1.

When the field effect transistor 5 turns on, the coil current flowing through the inductor 2 is converted into a voltage by the resistor 6. The voltage of the resistor 6 equivalent to the coil current is compared by the comparator 70a with the output voltage of the constant voltage circuit 14 that is divided by the resistors 70b and 70c, which is equivalent to the current threshold value.

When the voltage of the resistor 6 is smaller than an output voltage of the constant voltage circuit 14 that is divided by the resistors 70b and 70c, the comparator 70a outputs a high level, and otherwise outputs a low level. As a result, the comparator 80e outputs the first ON signal the high level period of which is constant.

When the field effect transistor 5 turns off, the field effect transistor 90e is turned on by the NOT circuit 90e of the OFF signal generating circuit 9. When the field effect transistor 90e turns on, charges stored in the capacitor 90d are discharged, and the voltage of the capacitor 90d becomes 0 V.

At the same time, the capacitor 90d starts charging by the current from the switching frequency varying circuit 11 that changes in the shape of triangular wave at a constant cycle. The voltage of the capacitor 90d increases gradually with a rate changing with the passage of time, determined from the current value of the switching frequency varying circuit 11 and the capacity of the capacitor 90d. It is compared by the comparator 80e with an output voltage of the constant voltage circuit 14 divided by the resistors 90a and 90b which is equivalent to a voltage threshold value.

When the voltage of the capacitor 90d is smaller than the output voltage of the constant voltage circuit 14 divided by the resistors 90a and 90b, the comparator 90g outputs a low level, and otherwise outputs a high level. As a result, the comparator 90g outputs the OFF signal the low level period of which changes with the passage of time after the transistor 5 turns off.

The first ON signal, the second ON signal and the OFF signal are inputted to the AND circuit 10a of the transistor driving signal generating circuit 10, and are subjected to the AND logic operation. By this operation, the AND circuit 10a periodically and intermittently outputs the transistor driving signal the high level period of which is constant and the low level period of which changes with the passage of time.

According to the third embodiment, the DC-DC converter 1 can surely change switching frequencies by changing the OFF time of the field effect transistor 5 by the switching frequency varying circuit 11. The DC-DC converter 1 can surely change the OFF time of the field effect transistor 5 by changing specified charging currents in the OFF signal generating circuit 9 by the switching frequency varying circuit 11. The DC-DC converter 1 can continuously and surely change specified charging currents in the OFF signal generating circuit 9 by the triangular waveform voltage generating circuit 11a and the voltage-current conversion circuit 11b of the switching frequency varying circuit 11.

Fourth Embodiment

Figure 4:
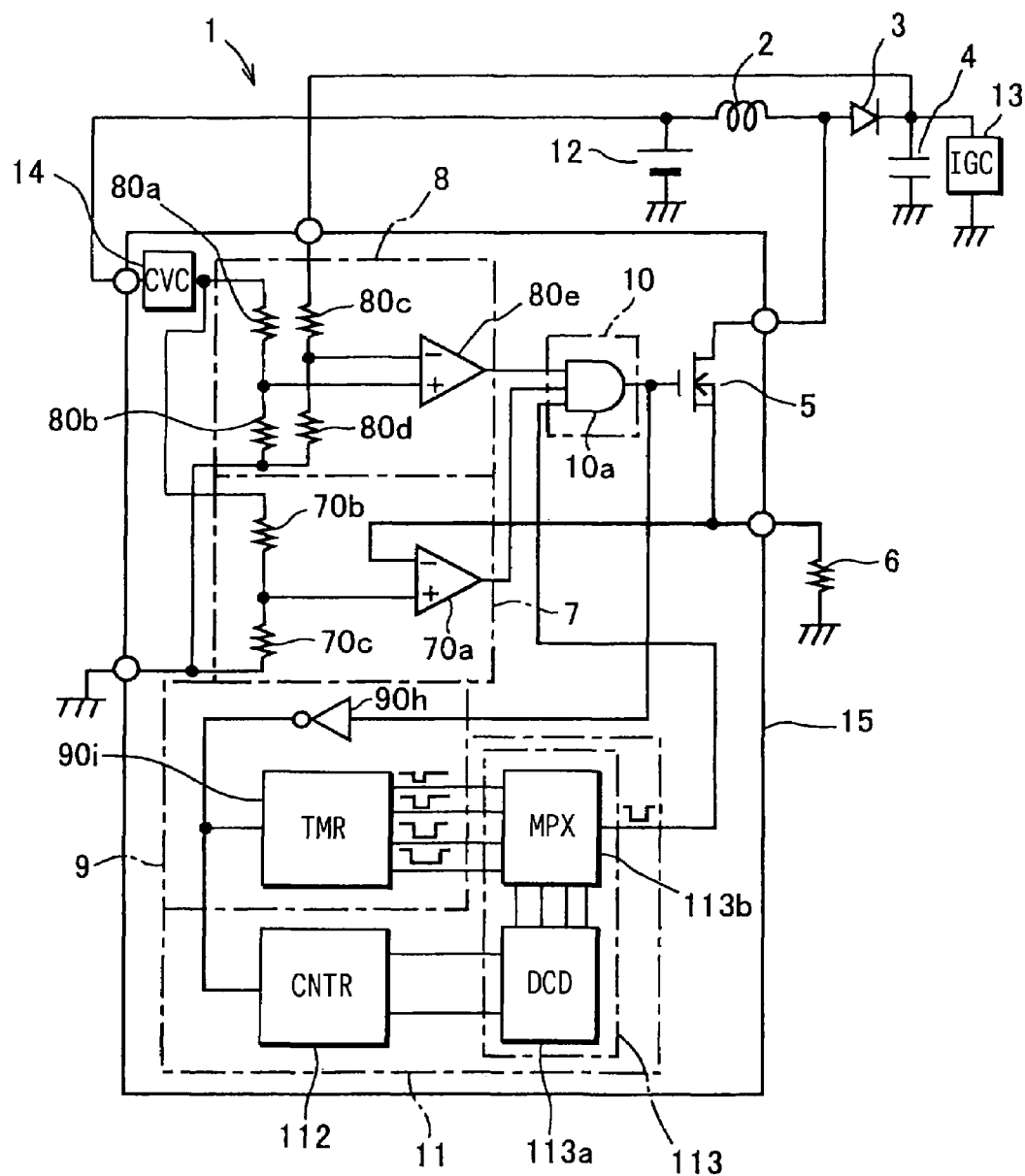
FIG. 4 is a circuit diagram of a DC-DC converter according to a fourth embodiment of the present invention.
Figure 5:
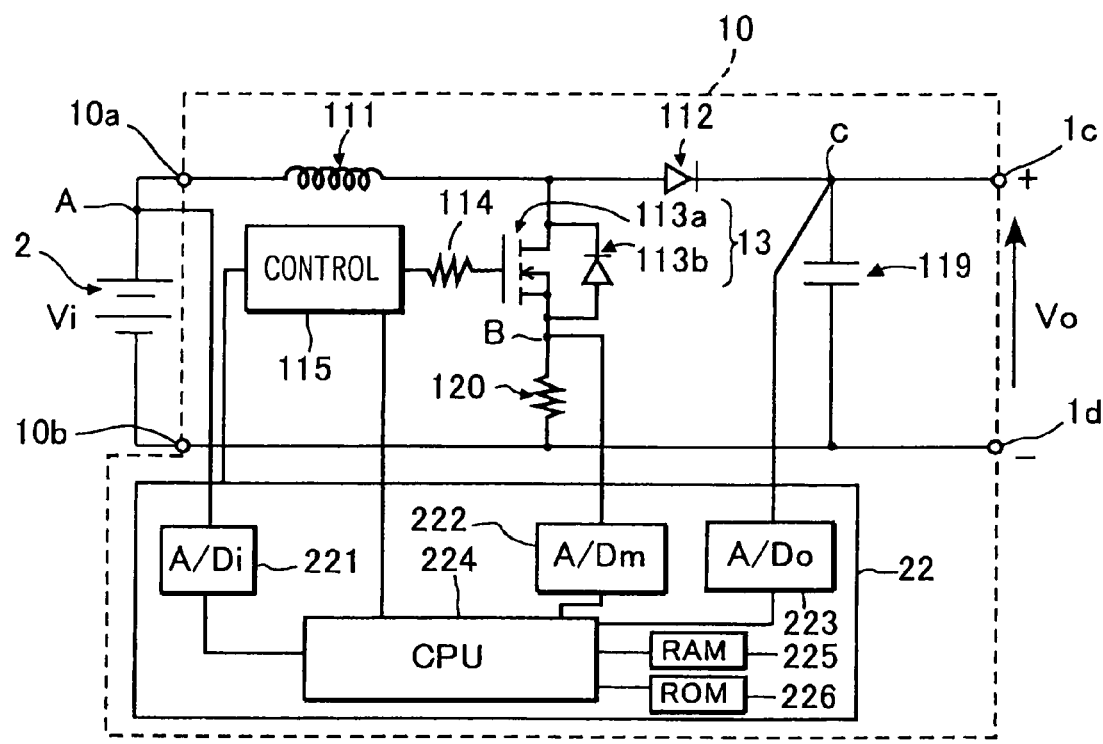
FIG. 5 is a circuit diagram of a conventional DC-DC converter.

The fourth embodiment shown in FIG. 4 is different from the first to the third embodiments in respect of the OFF signal generating circuit 9 and the switching frequency varying circuit 11.

The OFF signal generating circuit 9 generates four types of OFF signals that are different in the pulse width of low level. It includes a NOT circuit 90h and a timer circuit (TMR) 90i.

The input port of the NOT circuit 90h is connected to the output terminal of the AND circuit 10a of the transistor driving signal generating circuit 10. Its output terminal is connected to the input end of the timer circuit 90i. Four output ends of the timer circuit 90i are connected to the switching frequency varying circuit 11. The four types of OFF signals outputted from the OFF signal generating circuit 9 determine a variable range of switching frequencies, and their pulse widths are set to an optimum value so that no influence appears in the fluctuation of output voltages of the DC-DC converter 1.

The switching frequency varying circuit 11 successively switches four types of OFF signals generated by the OFF signal generating circuit 9 based on the number of switching operations of the field effect transistor 5. It includes a counter circuit 112 and an OFF signal switching circuit 113. The counter circuit 112 is a two-bit binary counter that counts the number of switching operations of the field effect transistor 5. The input terminal of the counter circuit 112 is connected to the output terminal of the NOT circuit 90h of the OFF signal generating circuit 9. Its two output terminals are connected to the OFF signal switching circuit 113.

The OFF signal switching circuit 113 successively switches and outputs four types of OFF signals generated by the OFF signal generating circuit 9 based on the result of counting by the counter circuit 112. It includes a decoder circuit (DCD) 113a and a multiplexer circuit (MPX) 113b.

The decoder circuit 113a converts binary output of the counter circuit 112 into decimal output. The two input terminals of the decoder circuit 113a are connected to the counter circuit 112. Its four output terminals are connected to the multiplexer circuit 113b.

The multiplexer circuit 113b selects one from four types of OFF signals generated by the OFF signal generating circuit 9 based on output of the decoder circuit 113a. The four input terminals of the multiplexer circuit 113b are connected to the output terminals of the decoder circuit 113a. Its output terminal is connected to an input terminal of the AND circuit 10a of the transistor driving signal generating circuit 10.

In operation, when the field effect transistor 5 turns off, the timer circuit 90i of the OFF signal generating circuit 9 outputs four types of OFF signals that are different in the period of low level, and the counter circuit 112 counts up each time. The counter circuit 112 outputs a two-bit signal corresponding to the number of switching operations of the field effect transistor 5 to the decoder circuit 113a of the OFF signal switching circuit 113.

The decoder circuit 113a decodes the output signal of the counter circuit 112 and outputs the decoded signal to the multiplexer circuit 113b. The multiplexer circuit 113b selects one of the four types of different OFF signals of the timer circuit 90i based on the decoder circuit 113, and outputs it to the AND circuit 10a of the transistor driving signal generating circuit 10.

According to the fourth embodiment, the DC-DC converter 1 can surely change the OFF signal of the field effect transistor 5 by switching the four types of OFF signals in the OFF signal generating circuit 9 that are different in OFF time, by the counter circuit 112 and the OFF signal switching circuit 113 of the switching frequency varying circuit 11.

The present invention should not be limited to the disclosed embodiments, but may be modified in many other ways without departing from the spirit of the invention.

What is claimed is:

1. A DC-DC converter for an electric load comprising:
   a DC power supply;
   a coil connected to the DC power supply;
   a switching element that is connected to the coil and controls a coil current supplied to the coil from the DC power supply by performing switching operations to produce a boosted output voltage for the electric load;
   a switching element driving signal generating circuit that generates a switching element driving signal for switching the switching element based on the coil current and the output voltage;
   a switching frequency varying circuit that changes a switching frequency of the switching element driving signal with passage of time regardless of the output voltage;
   a first ON signal generating circuit that determines a first ON time of the switching element based on a result of comparison between the coil current and a specified current threshold value, while generating a first ON signal corresponding to the first ON time;
   a second ON signal generating circuit that determines a second ON time of the switching element based on a result of comparison between the output voltage and a specified voltage threshold value, while generating a second ON signal corresponding to the second ON time; and an OFF signal generating circuit that generates an OFF signal corresponding to a specified OFF time of the switching element, wherein the switching element driving signal generating circuit generates the switching element driving signal based on the first ON signal, the second ON signal and the OFF signal, the switching frequency varying circuit changes the specified OFF time, the OFF signal generating circuit generates an OFF signal corresponding to the specified OFF time based on a result of comparison between a voltage of a capacitor charged with a specified charging current and a specified OFF time threshold value, and the switching frequency varying circuit changes the specified charging current with the passage of time.

2. The DC-DC converter according to claim 1, wherein the switching frequency varying circuit changes the first ON time with the passage of time.

3. The DC-DC converter according to claim 1, wherein the switching frequency varying circuit changes the specified current threshold value with the passage of time.

4. The DC-DC converter according to claim 1, wherein the switching frequency varying circuit includes a triangular voltage generating circuit that generates a triangular voltage, and a voltage-current conversion circuit that converts the triangular voltage into a current corresponding to the triangular voltage.

5. The DC-DC converter according to claim 1, wherein the switching element, the first ON signal generating circuit, the second ON signal generating circuit, the OFF signal generating circuit, the switching element driving signal generating circuit and the switching frequency varying circuit are integrally formed as an integrated circuit.

6. The DC-DC converter according to claim 1, wherein the specified OFF time corresponds to a discharge time of the coil.

7. A DC-DC converter for an electric load comprising:
a DC power supply;
a coil connected to the DC power supply;
a switching element that is connected to the coil and controls a coil current supplied to the coil from the DC power supply by performing switching operations to produce a boosted output voltage for the electric load;
a switching element driving signal generating circuit that generates a switching element driving signal for switching the switching element based on the coil current and the output voltage; and
a switching frequency varying circuit that changes a switching frequency of the switching element driving signal with passage of time regardless of the output voltage and that includes a triangular voltage generating circuit that generates a triangular voltage,
wherein the switching frequency varying circuit includes a counter circuit that counts the number of switching operations of the switching element, and a reference power circuit that successively switches and outputs plural voltages of different magnitudes based on a result of counting by the counter circuit.

8. The DC-DC converter according to claim 7, wherein the load includes a vehicle passenger protecting device for protecting vehicle passengers.

9. A DC-DC converter for an electric load comprising:
a DC power supply;
a coil connected to the DC power supply;
a switching element that is connected to the coil and controls a coil current supplied to the coil from the DC power supply by performing switching operations to produce a boosted output voltage for the electric load;
a switching element driving signal generating circuit that generates a switching element driving signal for switching the switching element based on the coil current and the output voltage;
a switching frequency varying circuit that changes a switching frequency of the switching element driving signal with passage of time regardless of the output voltage;
a first ON signal generating circuit that determines a first ON time of the switching element based on a result of comparison between the coil current and a specified current threshold value, while generating a first ON signal corresponding to the first ON time;
a second ON signal generating circuit that determines a second ON time of the switching element based on a result of comparison between the output voltage and a specified voltage threshold value, while generating a second ON signal corresponding to the second ON time; and
an OFF signal generating circuit that generates an OFF signal corresponding to a specified OFF time of the switching element, wherein
the switching element driving signal generating circuit generates the switching element driving signal based on the first ON signal, the second ON signal and the OFF signal,
the switching frequency varying circuit changes the specified OFF time,
the OFF signal generating circuit generates a plurality of OFF signals corresponding to specified different OFF times, and
the switching frequency varying circuit includes a counter circuit that counts the number of switching operations of the switching element, and an OFF signal switching circuit that successively switches and outputs the plurality of OFF signals based on a result of counting by the counter.

10. A DC-DC converter for an electric load comprising:
a DC power supply;
a coil connected to the DC power supply;
a switching element that is connected to the coil and that controls a coil current supplied to the coil from the DC power supply by performing switching operations to produce a boosted output voltage for the electric load;
a coil current detecting means that generates a current detection signal indicative of the coil current;
a periodic signal generating means that generates a reference signal regardless of the boosted output voltage, the reference signal having a varying magnitude with respect to time;
a comparing means that compares the current detection signal with the reference signal; and
a driving means that drives the switching element based on at least a comparison result of the comparing means, wherein
the periodic signal generating means includes a counter circuit that counts the number of switching operations of the switching element, and a reference power circuit that successively switches and outputs plural voltages of different magnitudes based on a result of counting by the counter circuit.

11. The DC-DC converter according to claim 10, further comprising:
a first ON signal generating circuit that determines a first ON time of the switching element based on a result of comparison between the coil current and a specified current threshold value, while generating a first ON signal corresponding to the first ON time;
a second ON signal generating circuit that determines a second ON time of the switching element based on a result of comparison between the output voltage and a specified voltage threshold value, while generating a second ON signal corresponding to the second ON time; and
an OFF signal generating circuit that generates an OFF signal corresponding to a specified OFF time of the switching element,
wherein the driving means generates a switching element driving signal based on the first ON signal, the second ON signal and the OFF signal.

12. The DC-DC converter according to claim 10,
wherein the periodic signal generating means includes a triangular voltage generating circuit that generates a triangular voltage, and a voltage-current conversion circuit that converts the triangular voltage into a current corresponding to the triangular voltage.

13. A DC-DC converter for an electric load comprising:
a DC power supply;
a coil connected to the DC power supply;
a switching element that is connected to the coil and that controls a coil current supplied to the coil from the DC power supply by performing switching operations to produce a boosted output voltage for the electric load;
a coil current detecting means that generates a current detection signal indicative of the coil current;
a periodic signal generating means that generates a reference signal regardless of the boosted output voltage, the reference signal having a varying magnitude with respect to time;
a comparing means that compares the current detection signal with the reference signal;
a driving means that drives the switching element based on at least a comparison result of the comparing means,
a first ON signal generating circuit that determines a first ON time of the switching element based on a result of comparison between the coil current and a specified current threshold value, while generating a first ON signal corresponding to the first ON time;
a second ON signal generating circuit that determines a second ON time of the switching element based on a result of comparison between the output voltage and a specified voltage threshold value, while generating a second ON signal corresponding to the second ON time; and
an OFF signal generating circuit that generates an OFF signal corresponding to a specified OFF time of the switching element, wherein
the driving means generates a switching element driving signal based on the first ON signal, the second ON signal and the OFF signal, and
the OFF signal generating circuit generates an OFF signal corresponding to the specified OFF time based on a result of comparison between a voltage of a capacitor charged with a specified charging current that is variable over time and a specified OFF time threshold value.

14. A DC-DC converter for an electric load comprising:
a DC power supply;
a coil connected to the DC power supply;
a switching element that is connected to the coil and that controls a coil current supplied to the coil from the DC power supply by performing switching operations to produce a boosted output voltage for the electric load;
a coil current detecting means that generates a current detection signal indicative of the coil current;
a periodic signal generating means that generates a reference signal regardless of the boosted output voltage, the reference signal having a varying magnitude with respect to time;
a comparing means that compares the current detection signal with the reference signal;
a driving means that drives the switching element based on at least a comparison result of the comparing means,
a first ON signal generating circuit that determines a first ON time of the switching element based on a result of comparison between the coil current and a specified current threshold value, while generating a first ON signal corresponding to the first ON time;
a second ON signal generating circuit that determines a second ON time of the switching element based on a result of comparison between the output voltage and a specified voltage threshold value, while generating a second ON signal corresponding to the second ON time; and
an OFF signal generating circuit that generates an OFF signal corresponding to a specified OFF time of the switching element, wherein
the driving means generates a switching element driving signal based on the first ON signal, the second ON signal and the OFF signal,
the OFF signal generating circuit generates a plurality of OFF signals corresponding to specified different OFF times, and
the periodic signal generating means includes a counter circuit that counts the number of switching operations of the switching element, and an OFF signal switching circuit that successively switches and outputs the plurality of OFF signals based on a result of counting by the counter.

* * * * *